(12) United States Patent
Tang et al.

(10) Patent No.: US 7,284,426 B2
(45) Date of Patent: Oct. 23, 2007

(54) MEASUREMENT APPARATUS FOR MEASURING FUEL CAPACITY USED IN A FUEL CELL SYSTEM

(75) Inventors: Yu Lin Tang, Taipei (TW); Hsi-Ming Shu, Taipei (TW); Feng-Yi Deng, Taipei (TW); Ya-Chien Chung, Taipei (TW)

(73) Assignee: Antig Technology Co., Ltd., Taipei (TW)

( * ) Notice: Subject to any disclaimer, the term of this patent is extended or adjusted under 35 U.S.C. 154(b) by 52 days.

(21) Appl. No.: 11/220,537

(22) Filed: Sep. 8, 2005

(65) Prior Publication Data

US 2006/0053881 A1 Mar. 16, 2006

(30) Foreign Application Priority Data

Sep. 10, 2004 (TW) .............................. 93127405 A

(51) Int. Cl.
*G01F 23/26* (2006.01)
(52) U.S. Cl. ................................... 73/304 R
(58) Field of Classification Search .............. 73/304 R, 73/304 C, 290 R
See application file for complete search history.

(56) References Cited

U.S. PATENT DOCUMENTS

| | | | | |
|---|---|---|---|---|
| 4,010,650 A | * | 3/1977 | Piatkowski, Jr. | .......... 73/304 C |
| 4,255,789 A | * | 3/1981 | Hartford et al. | ............. 701/108 |
| 4,382,382 A | * | 5/1983 | Wang | ........................ 73/304 R |
| 4,652,811 A | * | 3/1987 | Kwiat et al. | ................. 324/696 |
| 5,553,494 A | * | 9/1996 | Richards | ................... 73/304 R |
| 5,602,333 A | * | 2/1997 | Larrabee et al. | ............... 73/149 |
| 6,086,179 A | * | 7/2000 | Kishi | ............................ 347/7 |
| 6,254,212 B1 | * | 7/2001 | Coudray et al. | ................ 347/7 |
| 6,431,670 B1 | * | 8/2002 | Schantz et al. | ................. 347/7 |
| 6,810,732 B2 | * | 11/2004 | Shon | ........................ 73/304 R |
| 2005/0022595 A1 | * | 2/2005 | Eguchi et al. | ............ 73/304 R |
| 2005/0164286 A1 | * | 7/2005 | O'uchi et al. | ................... 435/6 |
| 2006/0005622 A1 | * | 1/2006 | Burdi et al. | .............. 73/304 C |

* cited by examiner

*Primary Examiner*—Hezron Williams
*Assistant Examiner*—Rodney Frank

(57) ABSTRACT

The present invention is to provide a measurement apparatus of measuring fuel capacity used in fuel cell system; the measurement apparatus comprises a sensor device, a resistor, an A/D converter and a controller. The sensor device comprises a first electrode and a second electrode and accommodated in fuel storage and/or fuel flow layer to detect the fuel capacity of the anode, the second electrode connects to a low level voltage, one terminal of the resistor connects to the first electrode, the other terminal electrically connects to a high level voltage. The input terminal of the A/D converter connects to the first electrode and the first terminal of the resistor to input a measuring analog voltage, and also converts into a measuring digital voltage, the controller connects to the A/D converter to input measuring digital voltage and converts into the liquid level of the anode fuel in the fuel storage and/or fuel flow layer.

4 Claims, 6 Drawing Sheets

US 7,284,426 B2

MEASUREMENT APPARATUS FOR MEASURING FUEL CAPACITY USED IN A FUEL CELL SYSTEM

FIELD OF THE INVENTION

The present invention is related to the fuel cell, especially to a measurement apparatus of measuring fuel capacity used in a fuel cell system.

BACKGROUND OF THE INVENTION

FIG. 1 is the structural figure of a conventional fuel cell system, comprising a fuel flow layer 27, a first power/signal transmission layer 19, an anode current collection layer 13, a membrane electrode assembly (MEA) layer 11, a cathode current collection layer 15, a second power/signal transmission layer 23 and an electromechanical control layer 21, wherein the anode current collection layer 13, MEA layer 11 and cathode current collection layer 15 construct a fuel cell core component 30. Taking the direct methanol fuel cell system as an example, fuel flow layer 27 flows through methanol solution and proceeds anode electro-chemical reaction on the anode terminal of MEA layer 11, the reaction formula is:

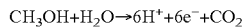
$$CH_3OH + H_2O \rightarrow 6H^+ + 6e^- + CO_2$$

The cathode electro-chemical reaction on the cathode terminal is formulated as:

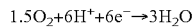
$$1.5O_2 + 6H^+ + 6e^- \rightarrow 3H_2O$$

Accordingly, the chemical energy is directly converted into low-voltage DC electrical power and delivered to the load 20.

In a direct methanol fuel cell system, when the used anode fuel of methanol solution is exhaust, one has to cease the electro-chemical reaction in the direct methanol fuel cell system to prevent the damage of fuel cell core component 30 which results in irreversible damage. Also another one has to supply methanol solution to the direct methanol fuel cell system for the demand of electro-chemical reaction. In order to avoid permanent damage, the first power/signal transmission layer 19 is placed a liquid level measurement system to detect the liquid level of anode fuel in the methanol solution.

The conventional liquid level measurement systems include capacitive, buoy, pressure, photo-sensitive, and acoustic measurements. These liquid level measurement systems always have volume and space constraints in practice, and also need huge and complicated mechanics and circuitries to measure the liquid level variation and thus limit many liquid level measurement systems in usage. Furthermore, in the small or miniaturized direct methanol fuel cell system, the conventional liquid level measurement system utilized in such small space always fails to effectively measure the liquid level variation, and even fails to use it. Therefore, the conventional liquid level measurement system design still has many shortages in the fuel cell system and needs to be improved.

SUMMARY OF THE INVENTION

The object of the present invention is to provide a measurement apparatus of measuring fuel capacity used in fuel cell system to prevent the anode fuel exhaust of fuel cell system which results in permanent damage.

Another object of the present invention is to provide a measurement apparatus of measuring fuel capacity used in fuel cell system to prevent the failure for effectively measuring the liquid level variation by using conventional liquid level measurement system in very small space.

To achieve the above objects, the present invention provides a measurement apparatus of measuring fuel capacity used in fuel cell system, comprising a sensor device, a resistor, an A/D converter and a controller. The sensor device comprises a first electrode and a second electrode and accommodated in fuel storage and/or fuel flow layer to detect the capacity of the anode fuel, the second electrode connects to a low level voltage, one terminal of the resistor connects to the first electrode, the other terminal electrically connects to a high level voltage. The input terminal of the A/D converter connects to the first electrode and the first terminal of the resistor to input a measuring analog voltage, and also converts into a measuring digital voltage, the controller connects to the A/D converter to input measuring digital voltage and converts into the liquid level of the anode fuel in the fuel storage and/or fuel flow layer.

Since the present invention is innovatively designed, possibly utilized and effectively improved, the invention patent is accordingly applied.

BRIEF DESCRIPTION OF THE DRAWINGS

These and other modifications and advantages will become even more apparent from the following detained description of a preferred embodiment of the invention and from the drawings in which.

DETAILED DESCRIPTION OF THE INVENTION

Figure 1:
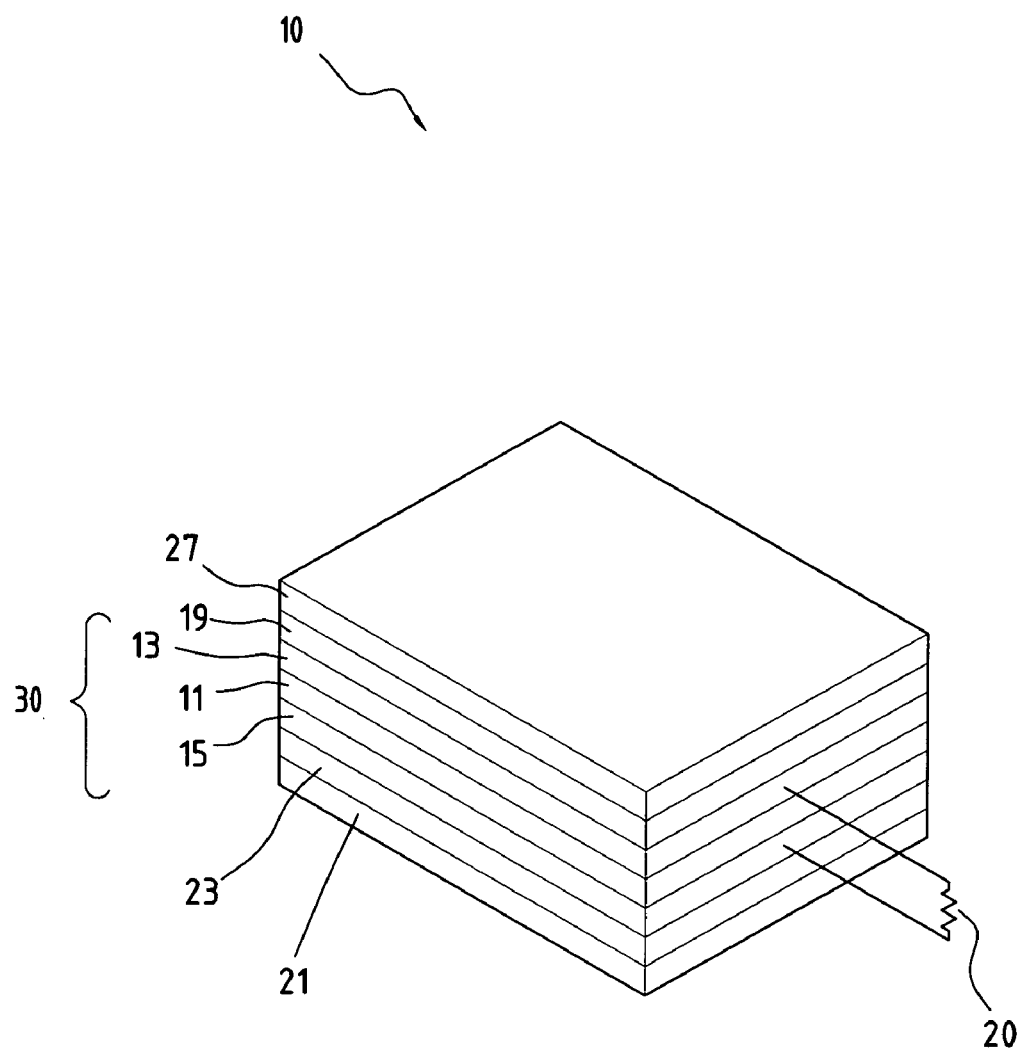
FIG. 1 shows the structural diagram of conventional fuel cell system.
Figure 2:
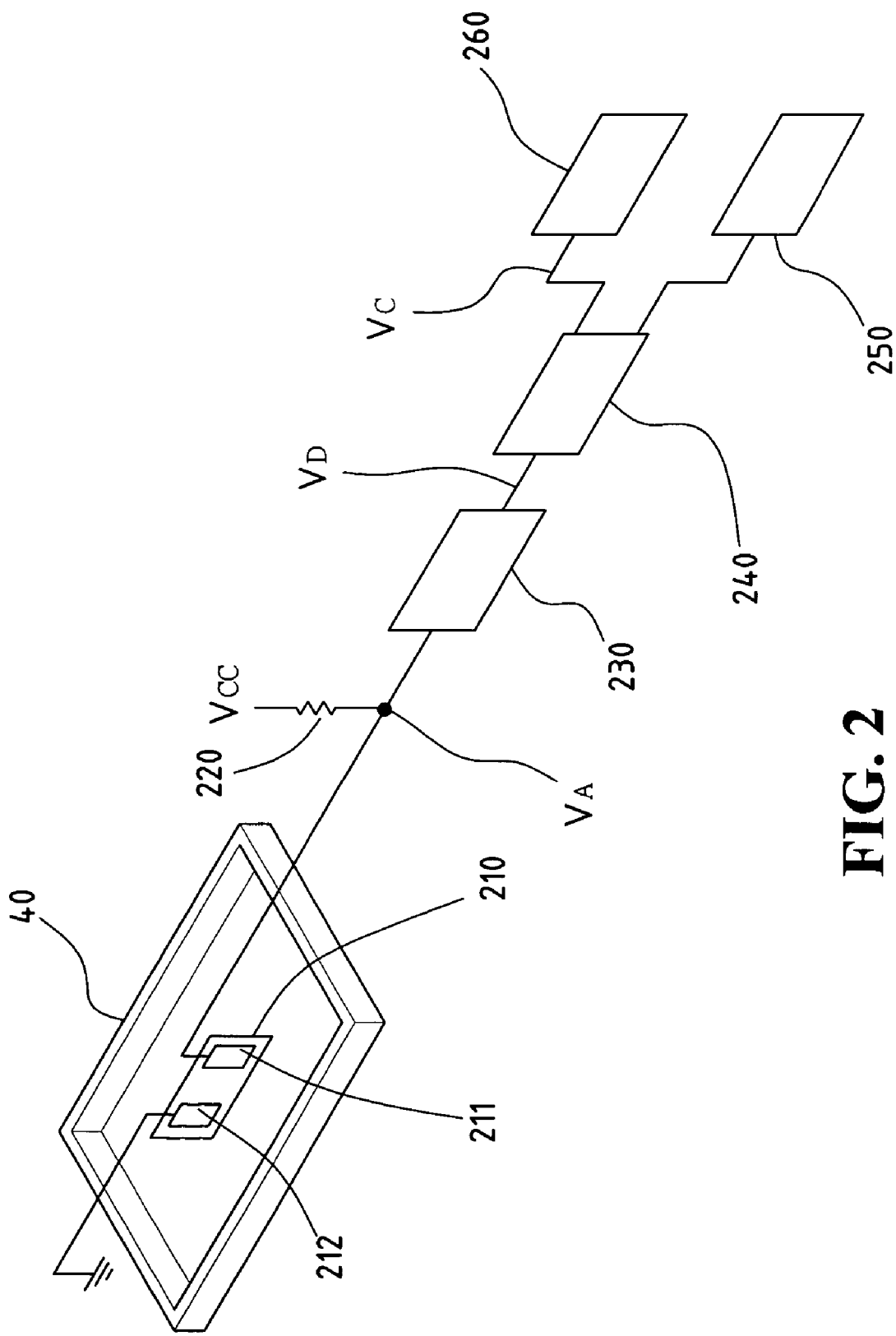
FIG. 2 shows the present invention's illustrative figure of one measurement apparatus of measuring fuel capacity used in fuel cell system.

FIG. 2 shows the present invention's illustrative figure of one measurement apparatus of measuring fuel capacity used in the fuel cell system, the fuel cell system is possible to be placed on the display panel of a electronic product (not shown) or inside other electronics (not shown). The fuel cell system (not shown) comprises a fuel storage 40 to store the anode fuel of the fuel cell system, either the fuel cell system (not shown) comprises a fuel flow layer 40 to support the flow of anode fuel. The measurement apparatus comprises a sensor device 210, a resistor 220, an A/D converter 230, a controller 240, a memory device 250 and an alarm device 260.

Figure 3A:
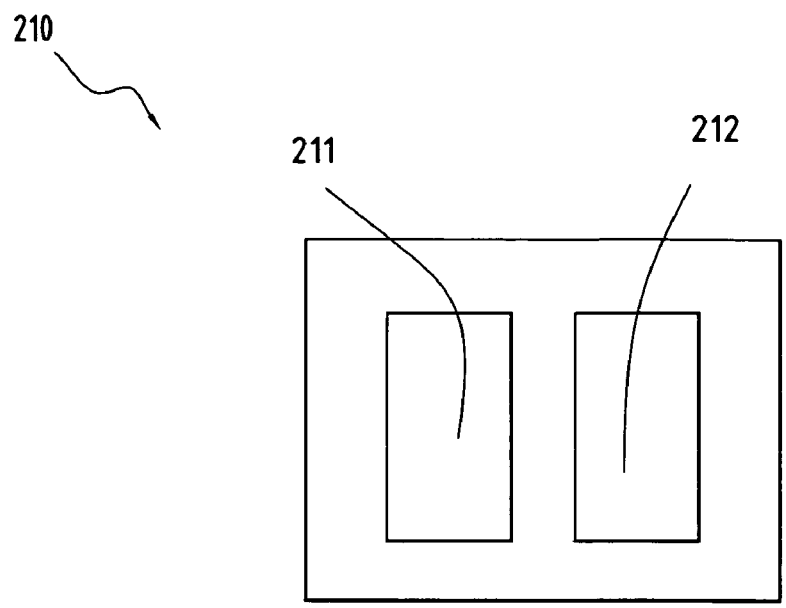
FIG. 3A shows the structural diagram of the first embodiment of the present invention sensor device.
Figure 3B:
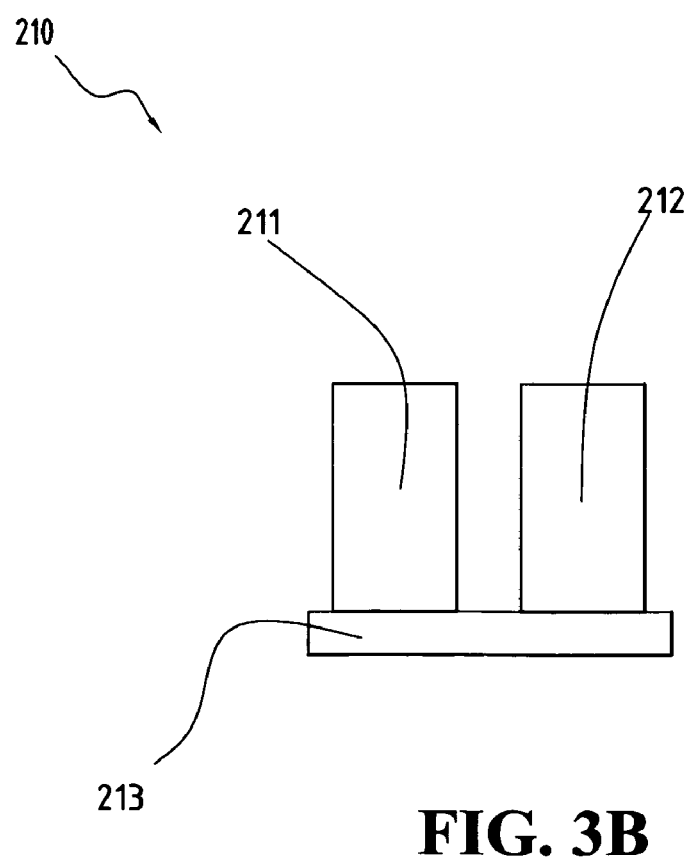
FIG. 3B shows the structural diagram of the second embodiment of the present invention sensor device.

Sensor device 210 comprising a first electrode 211 and a second electrode 212 is accommodated in fuel storage 40 and/or fuel flow layer 40 to detect the anode fuel capacity of fuel storage 40 and/or fuel flow layer 40. Second electrode 212 connects to a low level voltage which is the conventional ground (GND). As FIG. 3A shown, the embodiment means of sensor device 210 is possible to utilize the copper foil of a print circuit board (PCB) to produce first electrode 211 and second electrode 212. As FIG. 3B shown, other embodiment means of sensor device 210 is possible to use a fastened part 213 to fix first electrode 211 and second electrode 212.

The first terminal of resistor 220 connects to first electrode 211, the second terminal connects to a high level voltage (Vcc). The input terminal of A/D converter 230 connects to first electrode 211 and the first terminals of resistor 220 to input an A/D measurement voltage $V_A$ and convert into a digital measurement voltage $V_D$. Controller 240 connects to A/D converter 230 to input the digital measurement voltage $V_D$ and converts into liquid level of anode fuel in fuel storage 40 and/or fuel flow layer 40.

Figure 4:
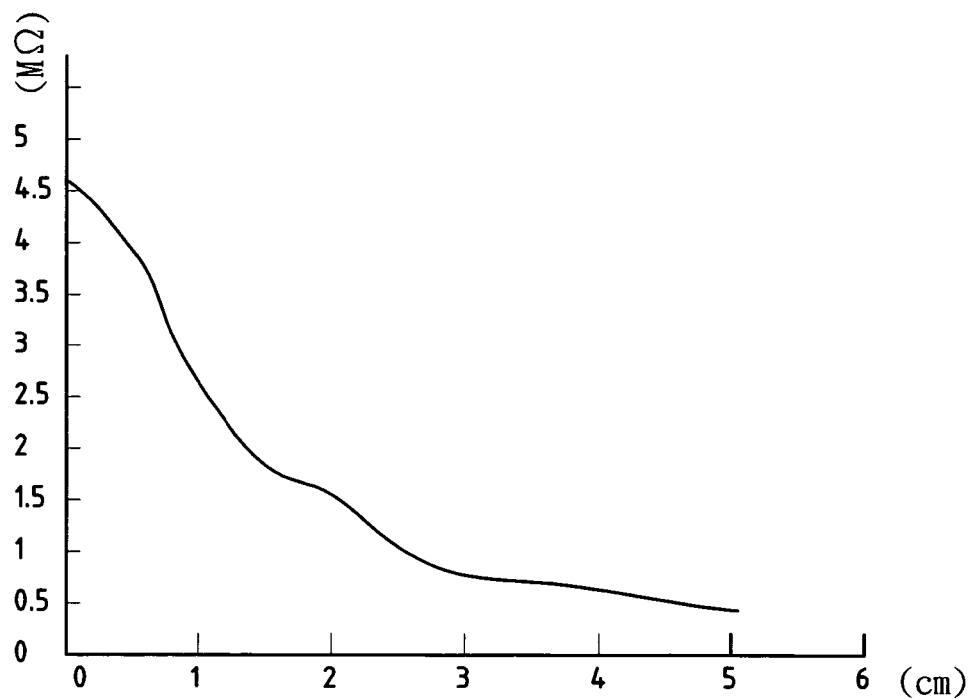
FIG. 4 shows the illustrated figure of the resistance between the present invention anode fuel liquid level and sensor device.
Figure 5:
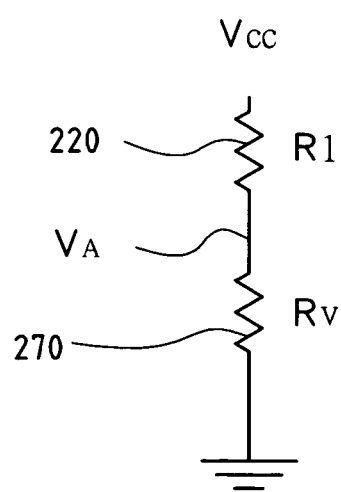
FIG. 5 shows the equivalent diagram of the present invention sensor device.

FIG. 4 shows the relationship figure of the resistance between the first electrode 211 and second electrode 212 of sensor device 210 and anode fuel liquid level of fuel storage 40 and/or fuel flow layer 40, wherein the horizontal axis denotes the anode fuel liquid level in unit cm, the vertical axis denotes the resistance between first electrode 211 and second electrode 212 in unit Mega Ohm (MΩ). From FIG. 4, when anode fuel level in fuel storage 40 and/or fuel flow layer 40 is low, sensor device 210 appears electrically open since the first electrode 211 and second electrode 212 are not contacted, meanwhile, the resistance of sensor device 210 is greater than 4.5MΩ. However, when anode fuel of fuel storage 40 and/or fuel flow layer 40 contacts with first electrode 211 and second electrode 212, sensor device 210 appears electrically conducting and the contact area of anode fuel contacting with first electrode 211 and second electrode 212, sensor device 210 appears lower resistance. Sensor device 210 is possibly emulated as a variable resistor 270, referring to FIG. 5 of the equivalent diagram of sensor device 210 and resistor 220. That is, the resistance $R_V$ of sensor device 210 is calculated by formula through the equivalent diagram of FIG. 5 while measuring voltage $V_A$, wherein R1 is the resistance of resistor 220. Again, from the relationship figure of the resistance and liquid level of FIG. 4, the liquid level of anode fuel is then obtained.

$$R_V = (V_A * R1)/(Vcc - V_A)$$

This relationship is possibly obtained by off-line measurement. At the same time, the relationship figure of the resistance and liquid level is possibly curve fitting to transform a formula with the resistance and liquid level. Controller 240 inputs the digital voltage $V_D$ and calculates the resistance $R_V$ by equivalent circuit and finally converts into the anode liquid level of fuel storage 40 and/or fuel flow layer 40 according to the formula.

The value R1 of resistor 220 is possibly used to decide measurement sensitivity, the present invention is possible to sense the sensitive voltage variation by selecting proper R1 value to make liquid level vary within a small range.

Figure 6A:
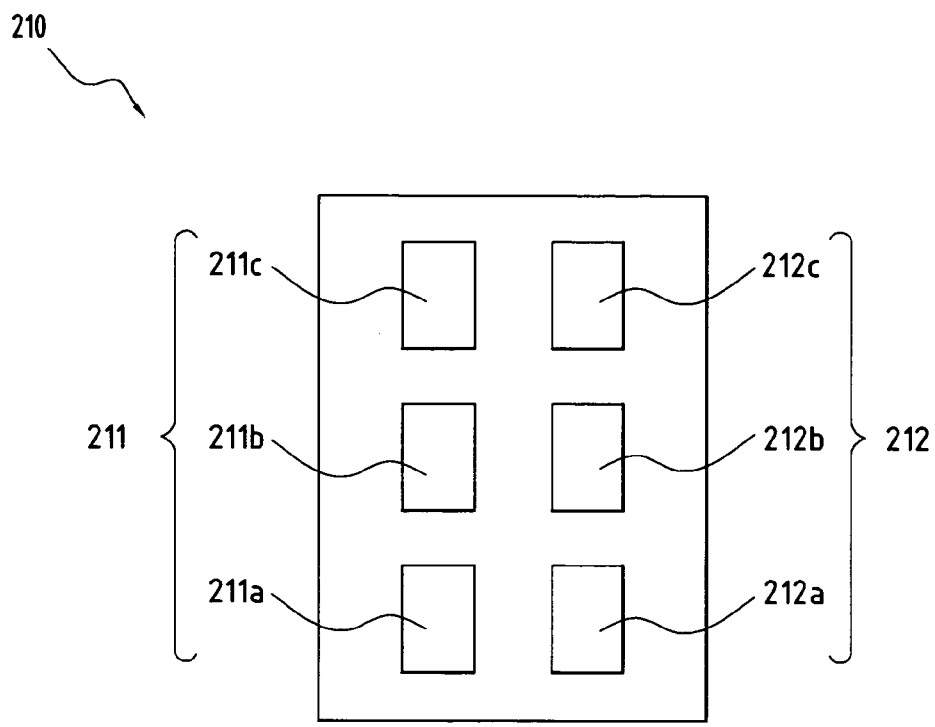
FIG. 6A shows the structural diagram of the third embodiment of the present invention sensor device.
Figure 6B:
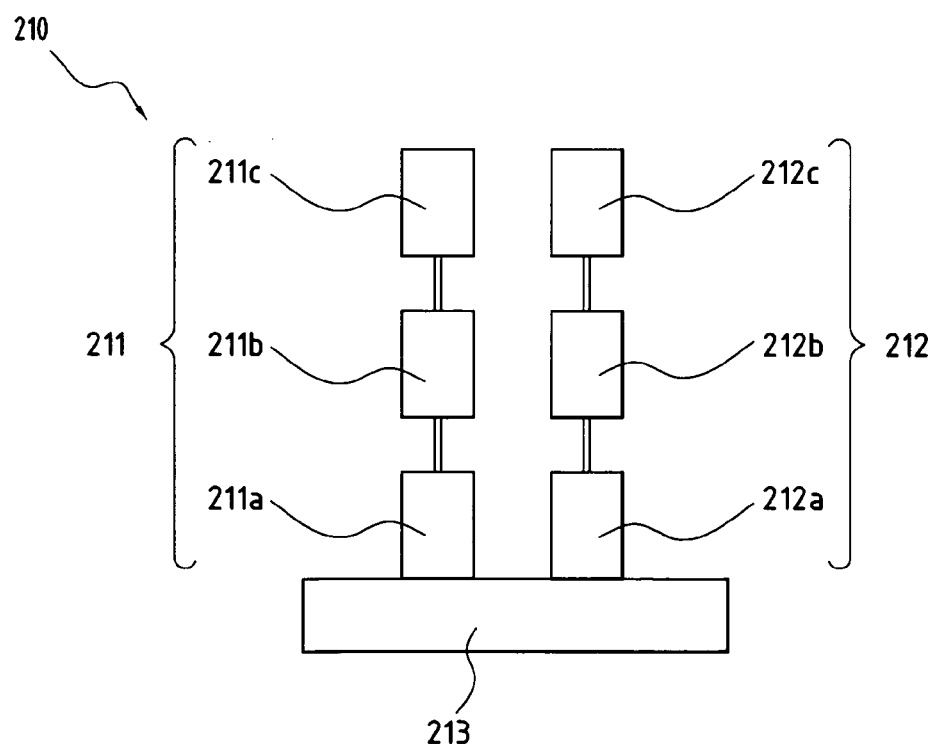
FIG. 6B shows the structural diagram of the fourth embodiment of the present invention sensor device.
Figure 7:
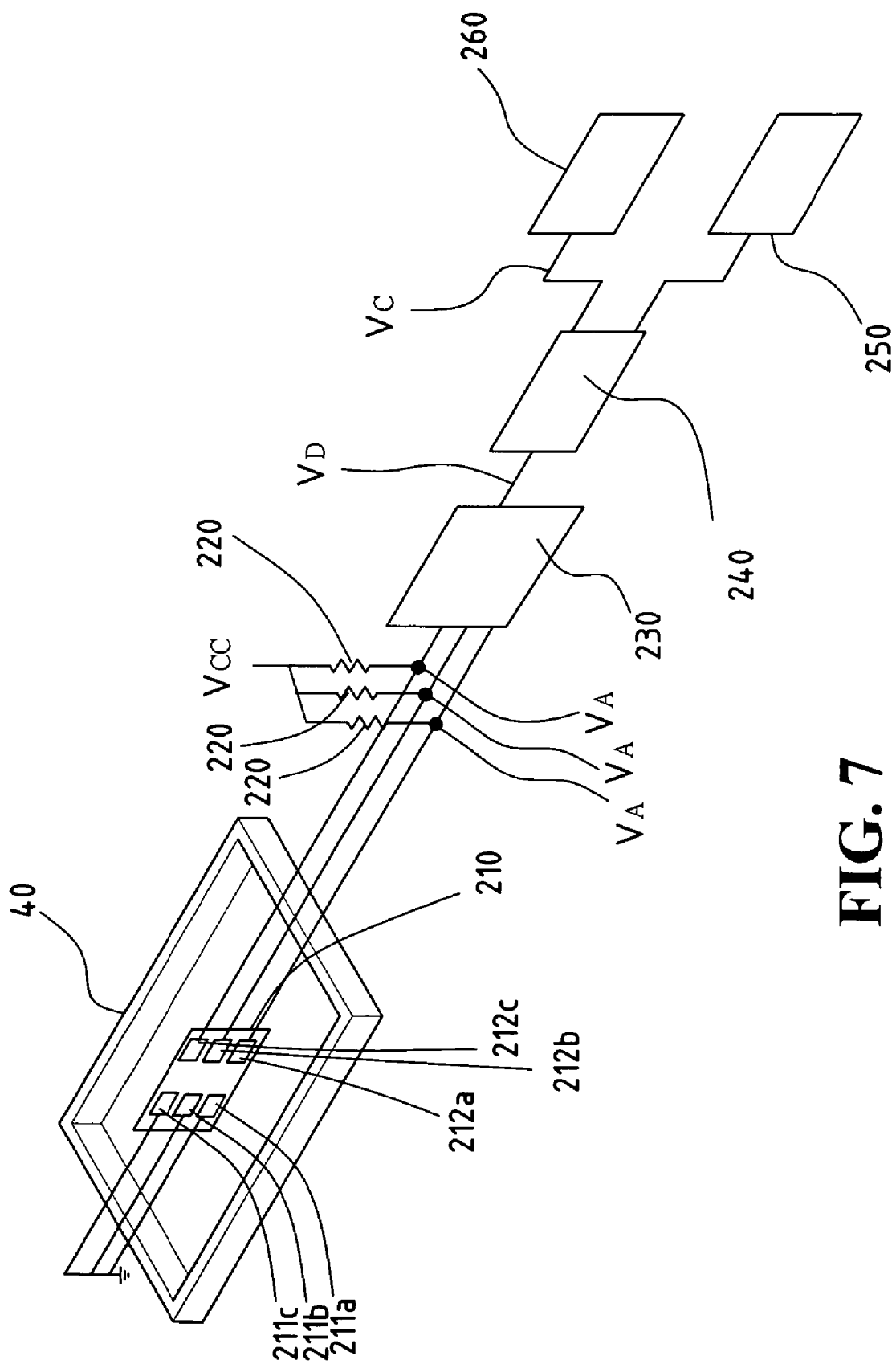
FIG. 7 shows the present invention illustrative figure of one measurement apparatus of measuring fuel capacity used in fuel cell system by utilizing plural electrodes.

FIG. 6A shows the structural diagram of the third embodiment of the present invention sensor device and FIG. 6B shows the structural diagram of the fourth embodiment of the present invention sensor device. As FIG. 6A shown, the embodiment means of sensor device 210 is possible to use the copper foil of a PCB to make first electrode 211 produce plural first electrode 211a, first electrode 211b, first electrode 211c and also make second electrode 212 produce plural second electrode 212a, second electrode 212b, second electrode 212c. As FIG. 6B, the embodiment means of sensor device 210 is possible to use a fastened part 213 to make first electrode 211 produce plural first electrode 211a, first electrode 211b, first electrode 211c and make second electrode 212 produce plural second electrode 212a, second electrode 212b, second electrode 212c and then fix them. Referring to FIG. 7, first electrode 211a and second electrode 212a of the first section offers the reference of safe lower limit liquid level, in case of anode fuel approaching the safe lower limit liquid level, the anode fuel should be supplied immediately. First electrode 211b and second electrode 212b of the second section offers the reference of normal liquid level, in case of anode liquid level staying at normal liquid level, it means that the supply of anode fuel is normal. First electrode 211c and second electrode 212c of the third section offers the reference of safe upper limit liquid level, in case of anode fuel approaching safe upper limit liquid level, the supply of anode fuel should be ceased immediately. The present invention uses the structure of plural first electrode 211 and second electrode 212 to obtain the convenience for immediately measuring the liquid level, and investigates the liquid level positioning in designated range by the aid of the voltage variation between two electrodes of each section. Of course, the present invention plural first electrode 211 and second electrode 212 is not limited by these three sections, the above disclosed three-sectional first electrode 211 and second 212 is only an example.

In FIG. 2, the measurement apparatus further comprises a non-volatile memory device 250 which electrically connects to controller 240. The relationship figure of the resistance and liquid level is possibly made as a table which describes the relation between the digital measurement voltage and anode fuel liquid level, and also saves in the non-volatile memory device 250. Controller 240 calculates the resistance $R_V$ according to the input digital measurement voltage $V_D$ and equivalent circuit. Finally, controller 240 obtains the liquid level of anode fuel in fuel storage 40 and/or fuel flow layer 40 by both the resistance $R_V$ and this table. When the input digital measurement voltage $V_D$ is outside the table, controller 240 is possible to obtain the liquid level of anode fuel in fuel storage 40 and/or fuel flow layer 40 by the interpolation.

In FIG. 2, the measurement apparatus further comprises an alarm device 260 which electrically connects to controller 240. When the liquid level of anode fuel is lower than a preset value, controller 240 will produce an alarm signal $V_C$. Alarm device 260 produce an alarm according to the alarm signal $V_C$, wherein alarm device 260 is possible to be a light emitting diode (LED). When the liquid level of anode fuel is lower than a preset value, it will produce a visual alarm signal. Alarm device 260 is possible to be a speaker or a buzzer. When the liquid level of anode fuel is lower than a preset value, it will produce an acoustic alarm signal.

In the present invention, A/D converter 230, controller 240 and memory device 250 are possibly to be integrated into a integrated circuit to save the volume and cost.

Since the present invention measurement apparatus possesses miniaturized property, the present invention therefore is possibly applied for the fuel cell system manufactured by the PCB process or applied for laminate integrated fuel cell system.

The present invention used in measurement apparatus of measuring fuel capacity of fuel cell system not only prevents the fuel exhaust of fuel cell system from permanent damage, but also avoids the constraint of the volume of conventional liquid level measurement system and utilizing space.

The above better embodiment is an example for convenient interpretation, the claimed scope of the present invention is within the following claims but not limited by the above embodiments.

What is claimed is:

1. A measurement apparatus of measuring fuel cell capacity used in fuel cell system comprising:
    a sensor device further comprising a multi-stage type first electrode set and a multi-stage type second electrode set, being accommodated into a fuel storage and/or a fuel flow layer to detect anode fuel capacity of the fuel storage and/or the fuel flow layer, said second electrode set being electrically connected to a low potential, wherein said first electrode set provides at least a first low limit electrode, a first middle electrode and a first high electrode and said second electrode set provides at least a second low limit electrode, a second middle electrode and a second high electrode corresponding to said first low limit electrode, said first middle electrode and said first high electrode respectively;
    at least three resistors each providing a first terminal being electrically connected to one of said first electrodes, and a second terminal being electrically connected to a high potential;
    an A/D converter providing input terminals being electrically connected to said first electrodes and the first terminal of the respective resistor to input analog measurement voltages and converts into corresponding digital measurement voltages; and
    a controller electrically connecting with the A/D converter to input the digital measurement voltages and converting the digital measurement voltages into liquid level of the anode fuel in the fuel storage and/or fuel flow layer.
    whereby, once liquid level of the anode fuel is detected by said low electrodes, insufficient amount of anode fuel is made up immediately; once liquid level of the anode fuel is detected by said middle electrodes, the liquid level is in a normal state; and once the liquid level of the anode fuel is detected by said high electrodes, filling the anode fuel is stopped immediately.

2. The measurement apparatus of claim 1, wherein the measurement apparatus further comprises an alarm device which electrically connects to the controller, and when the liquid level of anode fuel is lower than a preset value, the alarm device is canable of producing an alarm signal.

3. The measurement apparatus of claim 2, wherein the alarm device is a light emitting device (LED), and when the liquid level of anode fuel is lower than a preset value, the alarm device is capable of producing a visual alarm signal.

4. The measurement apparatus of claim 2, wherein the alarm device is a speaker or a buzzer, and when the liquid level of anode fuel is lower than a preset value, the alarm device is capable of producing an acoustic alarm signal.

* * * * *